No. 767,335. PATENTED AUG. 9, 1904.
R. EVERS.
DENITRATING PLANT.
APPLICATION FILED AUG. 28, 1902.
NO MODEL. 3 SHEETS—SHEET 1.
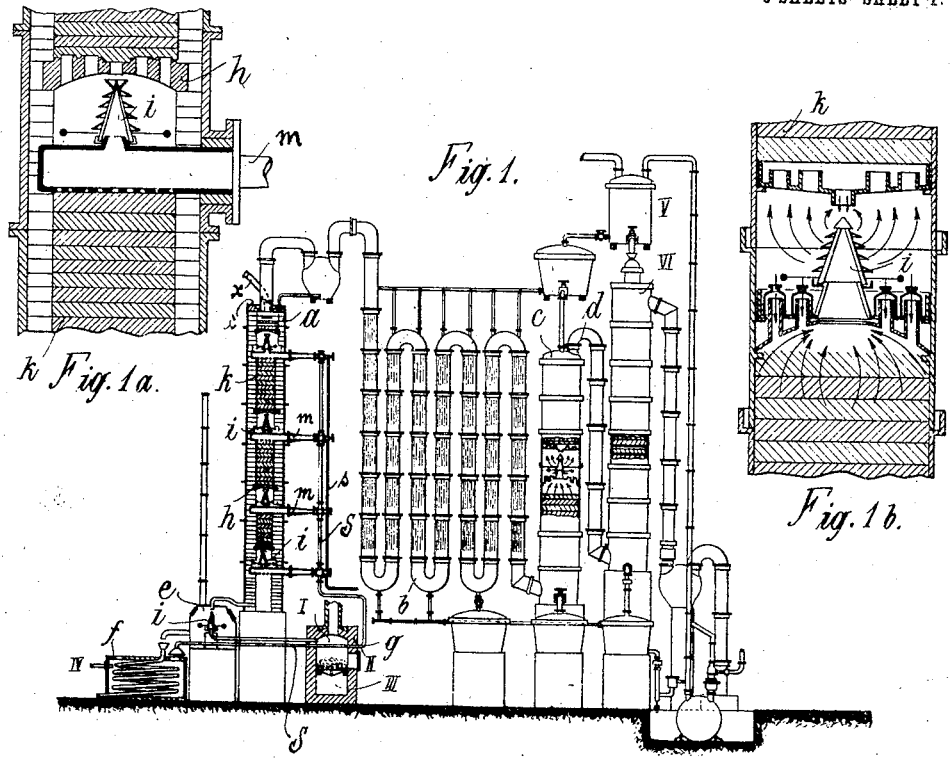
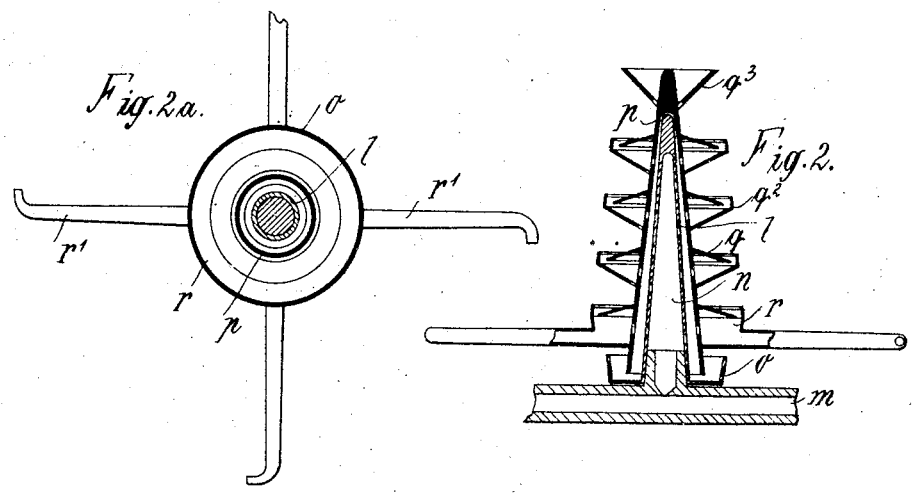
WITNESSES
INVENTOR
Robert Evers
BY
ATTORNEYS

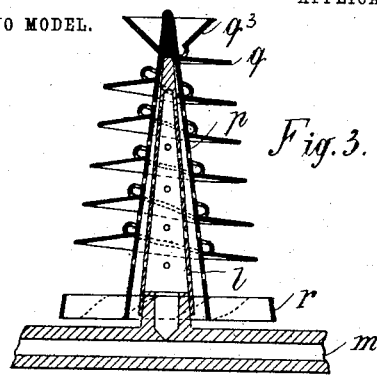
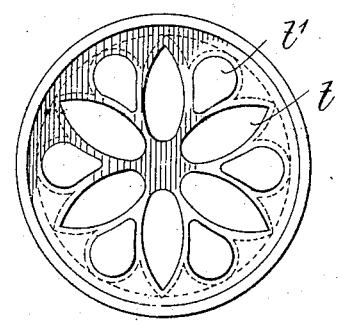
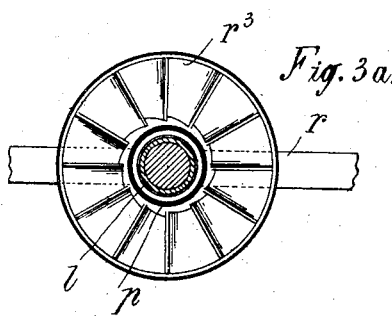
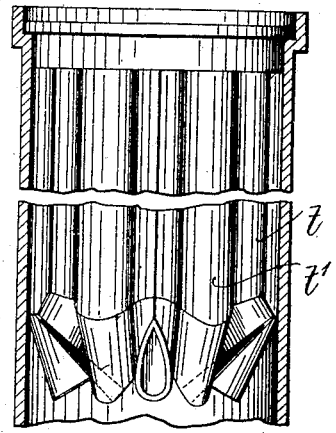
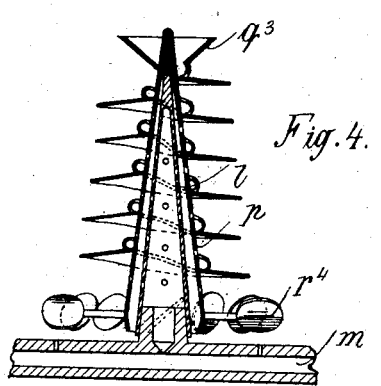
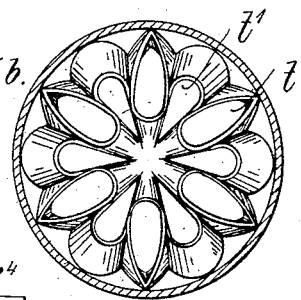
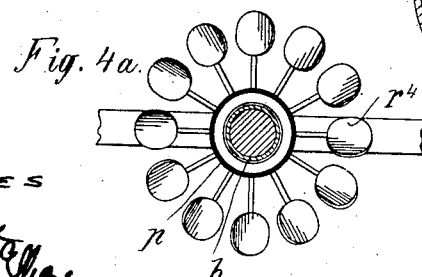

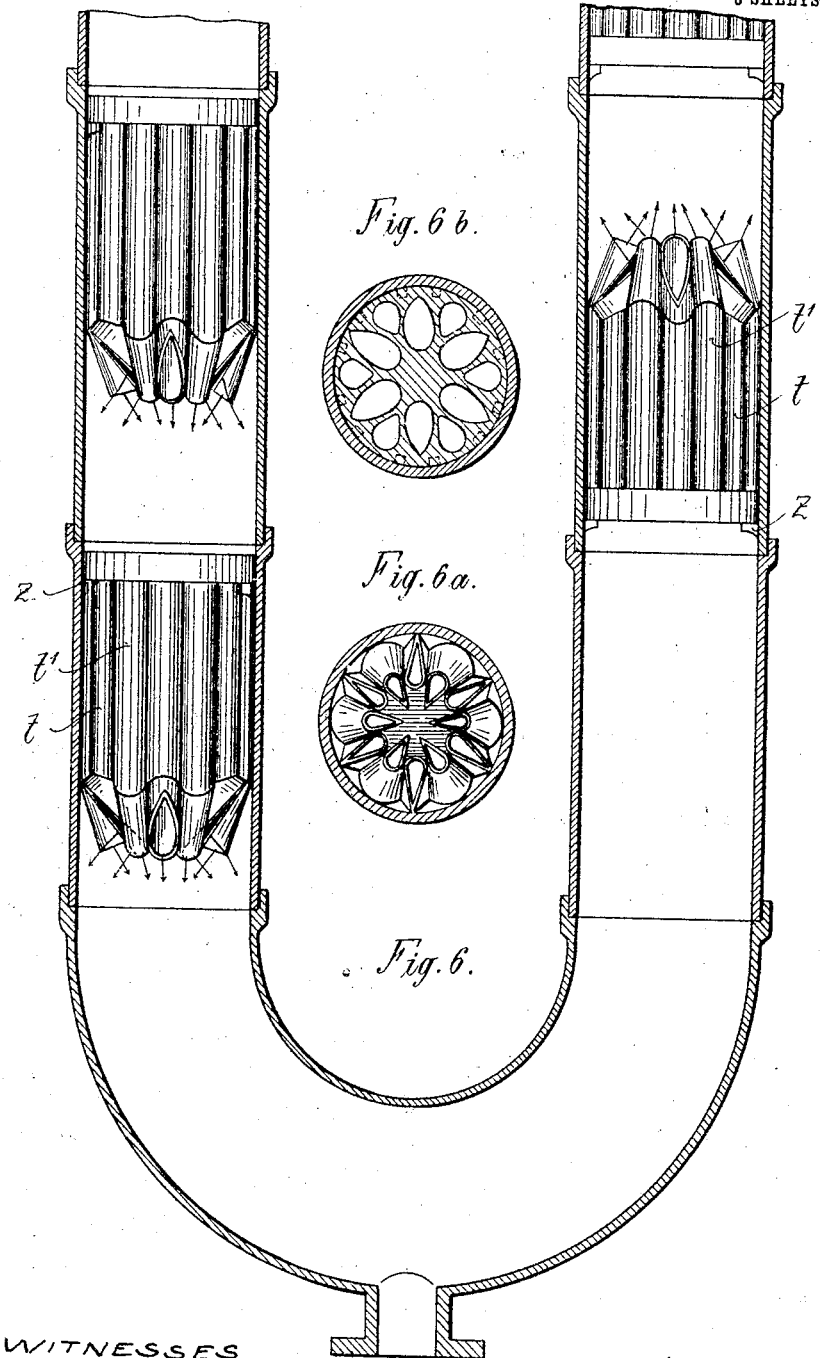

No. 767,335.

Patented August 9, 1904.

UNITED STATES PATENT OFFICE.

ROBERT EVERS, OF FÖRDE, GERMANY.

DENITRATING PLANT.

SPECIFICATION forming part of Letters Patent No. 767,335, dated August 9, 1904.

Application filed August 28, 1902. Serial No. 121,405. (No model.)

*To all whom it may concern:*

Be it known that I, ROBERT EVERS, engineer, of Förde, near Grevenbrück, Empire of Germany, have invented certain new and useful Improvements in Denitrating Plants; and I do hereby declare the following to be a full, clear, and exact description of the invention, such as will enable others skilled in the art to which it pertains to make and use it, reference being had to the accompanying drawings, which form part of this specification.

In the manufacture of sulfuric and nitric acids from an acid mixture apparatus or towers are employed in which the latter is resolved into its constituents. It is of importance for the process that the steam and air blown in are intimately mingled with the acid mixture, and this is effected by the employment of certain packing in the tower. The speed at which the gases pass through should also be regulated as far as possible. The packing material and arrangements in general hitherto employed in such denitrating plant, however, do not fulfil these conditions, since they do not present a sufficient surface and the packing is too close, so that passages or paths for the gases form, whereby thorough mixture of the gases is prevented. The draft in these towers—that is, the velocity of the gases flowing through—is with apparatus such as usually employed incapable of regulation and depends entirely upon external circumstances.

The subject of my invention is a plant for denitrating the acids and condensing and cooling the acid gases. Within the towers no loose packing material (simply shot in one piece on the top of the other) is employed, but special mixing apparatus is provided. The towers are divided into superposed chambers of appropriate height, in which instead of the packing material ordinarily used centrifugal apparatuses are located, whereby an intimate mingling of the gases and of the mixed acids with the gases is effected. The apparatuses are set in rotation by the gases flowing through or by special liquids, so that the gases or the liquids and the gases to be mixed are continually being thrown against each other. The tension of the gases flowing through is by this arrangement nullified, since it is utilized to perform work—viz., to rotate the apparatus. By the division of the tower into superposed chambers the gases passing through change their velocity in the various chambers and are caused to be compressed or thrown together and subsequently to expand again. By this means the speed of the gases can be regulated at will.

Another feature of the present improved denitrating plant is that in the pipes employed for condensing and cooling the gases in place of the usual filling, such as plates or the like, groups of pipes are provided, whereby the gases which flow through become intimately mingled, while at the same time a large cooling-surface is presented. These filling devices consist of a group of two sets of pipes egg-shaped and connected together. By this arrangement of groups of pipes the gases are caused to frequently alter their straight-line direction of flow and are, on the one hand, partly thrown or whirled together, and, on the other hand, partly deviated toward the cooling-walls. They present to the gases a very large surface for condensation.

My new denitrating plant is illustrated in the annexed drawings, in which—

Figure 1 is an elevation showing the general arrangement of the plant. Figs. 2 and $2^a$ show by vertical section and plan view, respectively, the mixing and condensing apparatus employed for the plant. Figs. 3 and $3^a$ show by similar views to Figs. 2 and $2^a$ a modification of the apparatus illustrated in the latter figures. Figs. 4 and $4^a$ by similar views show a third construction of such apparatus; Fig. 5 by a part vertical section, Fig. $5^a$ by plan view, and Fig. $5^b$ by a cross-section looking from below upward, illustrate a group of the pipes which are inserted in the cooling and condensing pipes. Fig. 6 is a section of part of the cooling-tubes, showing the mixing means therein.

The actual plant consists of the denitrating-tower $a$, connected to the cooling-pipes $b$, which lead to the condensing-tower $c$, while an outlet-pipe $d$ is also connected to the latter tower $c$. These towers are made of iron, as those in use before, walled up with stones, acidproof, and exteriorly surrounded by insulating infusorial earth. The compound acid goes through a regular clay cock (not shown) in a lead pipe $x$, through the sandstone cover $a'$ of the denitrating-column $a$.

The introduction of air and water steam into the denitrating-column takes place as shown in Fig. 1. In the furnace $g$ the steam-kettle I is over the fireplace III, where the necessary steam originates. Around the kettle is arranged in manifold windings the heating-coil II, where is warmed the air sucking into the column. This heating is continued in vessel $e$, where gathers and deposits the sulfuric acid coming hot by the chemical reaction from the denitrating-column. It rinses the conduits $s'$ of steam and air, which conduits go from the furnace $g$ through vessel $e$, from there to join the upright tube $s$, connected with the single-jet conduits $m$, fixed in the denitrating-column, and so conduct air and steam into the column. A special apparatus to let in air and steam is not necessary, as in consequence of the different gases condensing in the column and of the joined condensation-conduit $a$ sucking effect sets in. Under vessel $e$ is vessel $f$, containing a cooling-coil, where the hot sulfuric acid is so far cooled as to be let out at IV. For this purpose continuous cooling-water is led through vessel $f$.

For denitrating the acid mixture an intimate mingling of it with the air is necessary. For this purpose mixing apparatus, such as shown in Figs. 2, $4^a$, is inserted in the tower $a$. The tower itself is throughout its entire height divided into chambers of appropriate dimensions by means of horizontal partitions or roofs $h$. These chambers are packed with fillers, preferably condensing-pipes $k$, as shown in Figs. 5, $5^b$. The roofs $h$ are perforated, so that the liquid trickling down must flow together with the gases, running into the succeeding chamber in a stream, where falling upon the mixing apparatus it is again dispersed. There is thus a constant running together and dispersal of the acid mixture going on, so that all parts become intimately mingled.

The mixing apparatus employed consist, as Figs. 2, $4^a$ show, of a conical pipe $l$, which is set upon the gas-inlet pipe $m$ or the like and which is provided with outlet-apertures. A dish or tray $o$ may also be employed. The exterior cone $p$ is fitted over the pipe $l$. This cone $p$ is constructed with ribs or plates $q$ of such form that the liquid which falls upon the uppermost one descends from one to the other, spreading over the whole surface. The liquid then reaches the collecting tray or dish $r$, from which it flows out through the long arm or spout $r'$ of similar form to the arms of a reaction-turbine. The liquid flowing down will therefore set the exterior cone $p$ in rotation. In Figs. 2 and $2^a$ a modified construction of this mixing apparatus is shown. The plates $q$ are here provided with conical dishes or funnels $q^2$, in which the liquid flowing down collects and leaves through apertures located closely adjacent to the wall of the cone or funnel $p$, so as to descend upon the next tower-plate $q$. The vapor and air issuing from the pipes $m$ rises in the interior cone $l$ and escaping through its perforated walls flows below the plates $q$ and finally round their outer edge. Figs. 3 and $3^a$ show a further modification of this mixing apparatus. The plates $q$ are here constructed in the form $q$ of a screw thread round the exterior cone $p$. Attached to the bottom of the latter is the ring $r$, in which inclined surfaces $r^3$ are arranged. The descending liquid exercises a reaction on the latter, and thus sets the exterior funnel in motion.

In Figs. 4 and $4^a$ a similar construction of apparatus to that shown in Figs. 3 and $3^a$ is illustrated. Here, however, the blades are driven also by the compressed air and steam from the pipes, whereby fine jets strike against the blades $r^4$ of the exterior cone $p$. Into these mixing apparatuses gases or vapors—for example, air and steam—are blown in from outside through the inlet-pipe $s$. In the chambers of the tower below these mixing apparatuses filling means are inserted, whereby a maximum surface of contact between the acid mixture and the gases blown in is attained. The division of the denitrating-tower into various chambers and the arrangement of the above-described mixing apparatus present the great advantage that the filling or packing means, if of the kind ordinarily employed, cannot lie closely one part on the other, since their height is but small. In place of the means in general use groups of pipes, such as shown in Figs. 5 to $5^b$ may advantageously be employed. These groups consist each of two sets of pipes of egg-shaped section, the center lines of which meet at a point. These groups of tubes present an unusually large surface—viz., one hundred and fifty-five square meters per cubic meter content of tower—and thus excel in this respect the Guttmann towers, with ball-packing, with which a one hundred and twenty-three square-meter surface per cubic-meter content is attained, while the well-known tower, with plates only, affords a forty-eight square-meter surface. The group of pipes consists of the pipes F, the point of the egg-shaped section of which is outward, and of the pipes F', arranged between the first-named pipes F, with the point of the egg-shaped section lying inward pointing toward the center of the system. At the bottom the pipes $t$ and $t'$ are bent, the mouth of the pipes $t'$ pointing inwardly and that of pipes $t$ outwardly. The gases which flow through are therefore conducted inwardly through the pipes $t$ and those from the pipes $t'$ outwardly—that is, toward the periphery of the cooling-pipe, against which they strike with certain violence. The gases conducted toward the center strike against each other violently and unite in a vertical motion. By the adoption of these groups of pipes the gases are constantly caused to deviate from their line of motion, whereby they are prevented from flowing in a uniform jet or stream such as occurs in towers of the usual construction.

In the denitrating-tower $a$ the acid mixture is resolved into sulfuric and nitric acids. The former flows down into the receptacle $e$, in which it meets a mixing apparatus $i$ of the kind illustrated in Figs. 2 to $4^a$. The nitric acid escapes in gaseous form to the condensing-pipe $b$. This is constructed of length of piping in which groups of pipes $b'$, as shown in Figs. 5 to $5^b$, are suspended in order to present a large cooling-surface. The gases leaving this apparatus $b$ enter the condensing apparatus $c$, in which they are treated with a cooling and condensing liquid, acting in the same manner as the acid mixture in the tower $a$. The tower $c$ is divided into chambers by means of partitions, and in these chambers are located, respectively, the mixing apparatus $i$ and the filling $k$. Instead of the means ordinarily employed for the latter purpose groups of pipes, as shown in Figs. 5 to $5^b$, may here also be used.

The sulfuric acid after the removal of the nitric acid is so far heated in the apparatus $e$ that the water contained in it is vaporized, which steam is then utilized for the new process in the denitrating-tower.

By employment of the above-described apparatus the velocity of the gases flowing through can be regulated as required and the liquid and gases be intimately mixed.

By dividing the towers into a number of chambers in which groups of tubes are employed in place of the usual means the advantage is secured that the walls of the tower are subjected to but a small pressure, while the gases and liquid are mixed together most thoroughly.

The working of the apparatus is as follows: The compound acid enters the column $a$ through the pipe $x$ at the top thereof and runs on the uppermost rotating cone $i$, rotating through the action of the gases, and this cone spreads them at the same time over the whole section of the denitrating-column. While the compound acid runs over the shell of the rotating cone, it takes heat from the mixture of steam and air, which mixture has been conveyed to the compound body from outside by the conduits $m$, joined to the upright tube $s$. Between the uppermost and the next-following rotating cone the compound acid runs over filling means $k$, such as ordinarily used, or I may use the group of pipes $b'$ in place of the filling means after combining with the gases rising from below. In this way it takes further heat from the mass of air and steam passing through the column from below, so that the very fine compound-acid drops begin to lose part of their nitric-acid gases. On the bottom $h$ of the uppermost column-chamber the hot compound acid runs back to a central point in order to fall together through the middle opening upon the second rotating cone, through which it is again spread evenly and where the same action takes place. At a point between the second and third rotating cones the decomposition of the compound acid takes place. The compound acid is again spread very fine and repels the nitric acid. When the acid has flowed down over the last rotating cone and is separated upon the filling lying therein, the nitric acid is repelled to the highest degree, and the temperature of the sulfuric acid has become very high through the steam repeatedly blown in, and the hot air, aided as it is by the reaction heat, so that, as described, it can heat in vessel $e$ (where it again is divided by an especially large rotating cone) the mass of air and steam to about 150° centigrade. Through the strong heat, as through the rotating cones, a certain mass of water is, moreover, driven out from the aqueous sulfuric acid, and this can be used up in the process as steam, so that after this operation considerably less working steam is required. The liquid sulfuric acid, which after passing through vessel $e$ and cooling-coil in vessel $f$ leaves the latter at IV, is therefore quite concentrated and shows a density of 60° Baumé. The nitric acid enters in the form of gas mixed with steam and air from the denitrating-column into the condensing-conduit $b$, where a number of the bundles of pipes $b'$, Fig. 5, are suspended, as shown in Fig. 6. This bundle of pipes, with their openings of single pipes of oviform section, which openings point to different directions, produce a constant intermixture of the compound acid, consisting mainly of nitric acid, with the mass of air and steam, as at each issue from the single pipes of the bundle of pipes the gases conducted through them strike against one another and against the outer wall of the condensing-conduit, and thereby are always mixed together. In these bundles of pipes special weight is to be laid on the bending of the pipe-openings, which bending prevents the gas from passing through the entire conduit in single streams coming no longer in contact together, as happens in the application of the prior straight-running pipes, but provided with ribs, &c., projecting into the inner space of the pipes. By this heretofore-unknown arrangement the parts of gases conveyed through the single pipes of the bundles are always intermixed in the hollow spaces lying between the single bundles. From the condensing-conduit the acidified gases finally enter into the bottom of the condensing-column $c$, where the gases are mixed together and subjected to a cooling and condensing action, as before described.

Having thus described my invention, what I claim as new, and desire to secure by Letters Patent, is—

1. In combination in a plant for making sulfuric and nitric acids from an acid mixture, a denitrating-tower, means for supplying steam and hot air to said tower, a condensing-tower, cooling means connecting the said towers, perforated partitions in the said towers dividing them into chambers, and mixing means situated in the said chambers, substantially as described.

2. In combination in a plant for making sulfuric and nitric acids from an acid mixture, a denitrating-tower, means for supplying steam and hot air to said tower, a condensing-tower, cooling means connecting the said towers, and mixing means in the said towers comprising an internal perforated hollow cone, an exterior perforated hollow cone covering said first cone, plates projecting laterally from said exterior cone, said cones being rotated by the passage of the fluids, substantially as described.

3. In combination in a plant for making sulfuric and nitric acids from an acid mixture, a denitrating-tower, a condensing-tower, cooling means connecting the said towers and mixing means in the said cooling means consisting of groups of pipes of egg shape in cross-section, the lower ends of which are bent in opposite directions alternately, substantially as described.

In witness whereof I have hereunto signed my name, this 12th day of August, 1902, in the presence of two subscribing witnesses.

ROBERT EVERS.

Witnesses:
CARL SCHMITT,
GUSTAVE SINNHOLD.